Jan. 13, 1970  F. E. TARALA  3,488,928

DUAL FILTER

Filed May 19, 1967

INVENTOR.
FREDERICK E. TARALA

BY

ATTORNEY

United States Patent Office 3,488,928
Patented Jan. 13, 1970

3,488,928
DUAL FILTER
Frederick E. Tarala, Gates, N.Y., assignor to Dollinger Corporation, Rochester, N.Y., a corporation of New York
Filed May 19, 1967, Ser. No. 639,743
Int. Cl. B01d *35/14, 46/12*
U.S. Cl. 55—274　　3 Claims

ABSTRACT OF THE DISCLOSURE

Two annular filter cartridges of the radial-fin type are mounted in a housing coaxially one within the other, and are connected to the intake manifold of a compressor, so that air is drawn radially and successively through the cartridges to be filtered thereby before passing into the compressor or other apparatus on which the filter is used. The relative cleanliness of each cartridge is indicated by a gauge, which measures the pressure differential between the inside and outside of each cartridge. The outer or prefilter cartridge may be removed and cleaned without disconnecting the inner cartridge.

---

Figure 1:
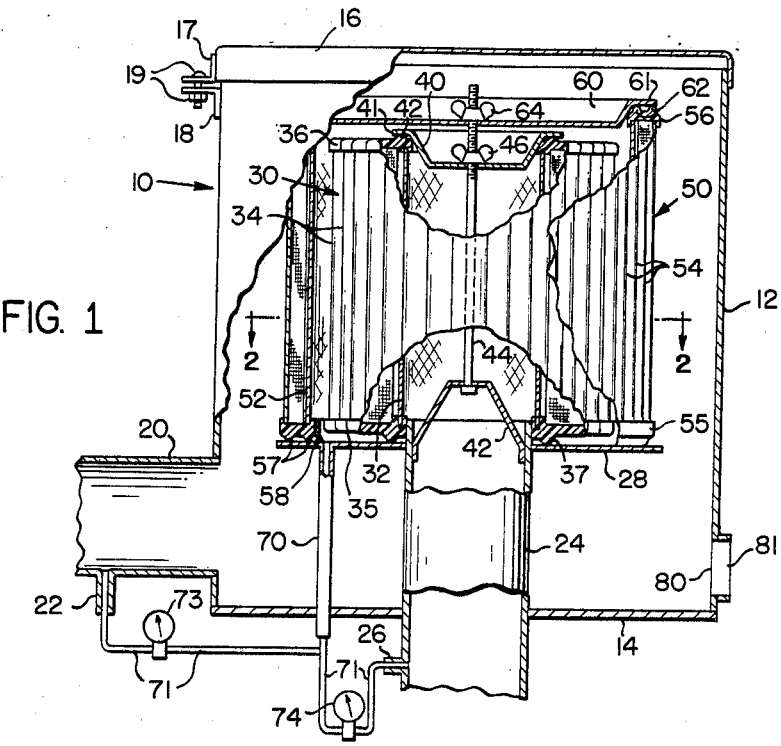

This invention relates to filters, and more particularly to filters of the type that employ replaceable, radial-fin filter cartridges.

In air inlet filters for compressors and the like, it is conventional to employ a single replaceable filter cartridge of the radial-fin type. Incoming air is drawn radially through the filter cartridge and into the compressor manifold. When the porous walls of the cartridge become excessively dirty or clogged, it is the practice to remove the cartridge, and to clean or replace it.

The disadvantage of this practice is that the compressor must be shut down each time the filter is removed; otherwise unfiltered, dust-laden air will be drawn into the compressor. Heretofore, moreover, there has been no satisfactory means for detecting exactly when the cartridge has become exceptionally dirty or clogged, and is in need of cleaning or replacement.

It is an object of this invention to provide an improved filter for the purpose described, which is substantially more efficient and longer-lasting than prior such filters.

Another object of this invention is to provide a dual air filter having two cartridges, one of which can be removed and cleaned without shutting down the compressor, or other machine on which the filter is used.

A further object of this invention is to provide means for detecting when each of the cartridges in a dual filter of the type described is in need of cleaning or replacement.

Other objects and advantages of this invention will be apparent hereinafter from the specification and from the recital of the appended claims, particularly when read in conjunction with the accompanying drawing.

SUMMARY OF THE INVENTION

The invention illustrated herein comprises a pair of generally annular, radial-fin filter cartridges, which are removably mounted in a housing in radially spaced coaxial relation one within the other. The lower ends of the cartridges are removably seated sealingly against the upper face of a flat plate, which has a central opening that is connected to the intake manifold of a compressor. The upper ends of the two cartridges are sealed by two separate caps, which are removably secured to a stud that projects vertically through the axial bore of the inner cartridge.

Gauges are connected to the bore of the inner cartridge, to the space between the cartridges, and to the housing interior, to detect any change in pressure differentials that would indicate that a cartridge has become excessively dirty.

In use, air is drawn by the compressor through an inlet opening in the housing, then radially and successively through the two cartridges to the axial bore of the inner cartridge, then to the compressor manifold. Most of the dust and dirt particles are removed from the air as it passes radially through the outer filter, or prefilter, so that the inner filter seldom need be cleaned or replaced. Moreover, when the associated gauge indicates that air flow through the outer filter has been reduced undesirably, the outer filter can be readily removed and cleaned, or replaced, without disconnecting the inner filter. During this cleaning or replacement the compressor may remain in operation, since the inner filter remains secured in place to filter incoming air.

Figure 2:
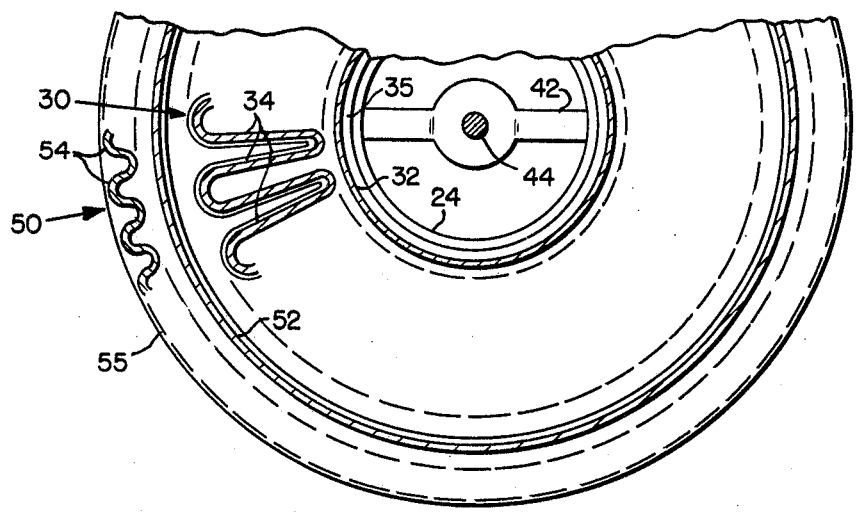

In the drawing:

FIG. 1 is a fragmentary elevational view of a filter made in accordance with one embodiment of this invention, parts thereof being cut away and shown in section; and FIG. 2 is an enlarged fragmentary sectional view taken along the line 2—2 in FIG. 1 looking in the direction of the arrows.

Referring now to the drawing by numerals of reference, the illustrated filter comprises a hollow housing 10 having an annular wall 12, which is open at its upper end, and which is sealed at its lower end by a transverse bottom wall 14. Removably positioned over the upper end of wall 12 is a cover 16. Secured to the outside periphery of cover 16 at angularly spaced points thereabout are a plurality of right angular lugs 17, each of which registers with one of a like plurality of right angular lugs 18, that are secured to the upper end of wall 12 at angularly spaced points thereabout. The registering lugs 17 and 18, only one pair of which is illustrated in FIG. 1, are secured to one another by conventional screw and nut combinations 19, which hold the cover 16 removably in place.

Welded or otherwise secured at one end in an opening formed in the wall 12 adjacent the lower end of housing 10 is an air inlet pipe 20. A pressure tap or tube 22 communicates with the interior of pipe 20 exteriorly of the housing 10. Secured intermediate its ends in a central opening formed in the bottom 14 of the housing 10 is an air outlet pipe 24, which is also provided exteriorly of the housing with a pressure tap or tube 26 which communicates with the interior of pipe 24.

Secured to and surrounding the upper or inner end of the pipe 24 coaxially thereof, and disposed in housing 10 in radially spaced coaxial relation to the inside of wall 12, is a circular supporting plate 28. Seated at its lower end on the upper surface of supporting plate 28 coaxially of pipe 24 is a radial-fin type filter cartridge 30. This cartridge is similar to that disclosed in the U.S. Patent No. 2,962,121. It comprises an inner cylindrical core or screen 32 made of screening, expanded metal, or the like, which is surrounded by a foraminous filter element that is folded to form a plurality of radially projecting, axially-extending fins or pleats 34. Opposite ends of the core 32, and the pleats 34, are embedded in molded, elastomeric end caps 35 and 36, respectively.

Pipe 24 projects slightly above the upper surface of the plates 28, and snugly into a central bore in the lower end cap 35 to seal the lower end of the bore in the cartridge 30 in communication with the pipe 24. Cap 35 has an annular boss 37 on its underside, which surrounds the central opening in the cap 35 coaxially thereof, and which engages the upper surface of the plate 28 to augment the seal between the plate and the cartridge 30. The upper end of the bore in the cartridge 30 is sealed by a dish-shaped cap 40, whose dished portion projects through a central opening in the upper end cap 36 into the bore of the filter element 30. At its periphery cap 40 has a flat lateral, circumferential flange 41 that overlies the upper surface of cap 36 and seats on the elastomeric circular rib 42 thereof.

Opposite ends of an inverted, generally U-shaped strap 42 are welded or staked to the inside of pipe 24 at diametrally opposite points thereof, adjacent the upper end thereof, so that the strap projects into the lower end of the bore of cartridge 30. An elongate bolt 44 is anchored at its lower end to the strap 42, and extends coaxially upwardly through the bore of cartridge 30, and through a registering opening in the cap 40. A wing nut 46 is threaded onto the upper end of the bolt 44, to draw the cap 40 snugly into the upper end of the bore in the cartridge 30, and to secure the lower end of the latter sealingly against the plate 28.

Also seated at its lower end against the upper surface of the support plate 28, and surrounding the cartridge 30 in radially spaced, coaxial relation thereto is a second, or outer filter cartridge 50. Like cartridge 30, cartridge 50 comprises a cylindrical core 52, which is made of screening, expanded metal, or the like, and which is surrounded by a foraminous filter element that has radially-directed, directed, and axially-extending fins or pleats 54. Opposite ends of these pleats 54 and the screen 52 are embedded in molded, elastomeric end caps 55 and 56, respectively. The lower cap 55 has a pair of annular beads or bosses 57, which engage the upper surface of the plate 28 to seal the lower end of cartridge 50 thereagainst. A further seal 58 on the lower end assures against possible leakage of air at the sealing locations. The upper end of the bore in the cartridge 50 is closed by a dish-shaped cap 60, which has a lateral, circumferential flange 61 that overlies a pair of annular bosses 62 which are concentric with one another and integral with the upper end of cap 56 of cartridge 50.

The upper end of the bolt 44 projects through a central opening in the cap 60; and a wing nut 64 is threaded onto the upper end of the bolt, and against cap 60 to secure it in the upper end of the cartridge 50, and to hold the latter against movement on the plate 28.

Secured at its upper end in an opening in the plate 28 to communicate with the annular space between the cartridges 30 and 50 is a pressure tap or tube 70. Tube 70 projects at its opposite end out of the bottom 14 of the housing 10.

At their outer ends the taps 70, 22 and 26 are connected by tubing 71 to pressure measuring instruments such as, for example, the differential pressure gauges illustrated schematically at 73 and 74.

In use, the outlet pipe 24 of the filter is connected to the inlet manifold of a compressor, or the like so that air is drawn through the pipe 20, and radially and successively through the filter cartridges 50 and 30 to the bore of inner cartridge 30, and thence into the compressor or other machine on which the filter is employed. When the filter cartridges 30 and 50 are clean, the vacuum created in the housing 10 should be nearly uniform, so that the pressure differential between the outlet pipe 24 and the space between the cartridges, as indicated by the gauge 74, will be negligible, as will be the pressure differential indicated by gauge 73. After the filter has been in use for some time, the dirt and dust, that is filtered out of the air by the outer cartridge 50, will tend to plug the pores of this outer filter, and as a consequence causing the pressure differential between the inlet pipe 20 and the space between the cartridges 30 and 50 to increase. When the outer cartridge 50 becomes exceptionally dirty, as for example when gauge 73 indicates that an arbitrary, predetermined pressure differential between the inlet pipe 20 and the space between the filter cartridges has been reached, the housing cover 16, the wing nut 64, the cap 60, and the outer cartridge 50 can be removed without disturbing the inner cartridge 30, and without shutting down the operation of the compressor or other apparatus on which the filter is being used, since the incoming air will still be filtered by the cartridge 30. The cartridge 50 may then be cleaned and reinserted into the housing, or may be replaced by a new cartridge.

After a prolonged period of use, the inner cartridge 30 may begin to clog up from the dirt that filters through the outer cartridge 50, or which is admitted to the inner cartridge, when the outer cartridge is being cleaned. The relative cleanliness of the inner cartridge 30 will be a function of the pressure differential between the outlet pipe 24 and the space between the cartridges 30 and 50, as indicated by the gauge 74. When this pressure differential reaches a predetermined arbitrary value, the inner cartridge 30 may be removed and cleaned, or replaced, as desired. Since most of the dirt is filtered out of the incoming air by the outer cartridge 50, it will be apparent that the inner cartridge 30 seldom needs to be cleaned or replaced.

From the foregoing it will be apparent that the novel filter disclosed herein provides simple and effective means for permitting continuous operation of a compressor, or other machine, even during the time that the filter cartridge 50 is removed for cleaning. The instant invention also provides relatively simple, visible means for determining when each cartridge is in need of cleaning.

If desired, a clean-out opening 80, which is closed by a removable cap 81, may be provided near the bottom of the housing 10 to allow the removal from the housing of dirt and foreign particles that drop to the bottom of the housing.

While the invention has been described as being particularly useful for an air filter, it will be apparent that it may be applied also to other types of fluid filters.

Having thus described my invention, what I claim is:
1. A filter comprising
   a housing having a detachably mounted top wall, a side wall and a bottom wall and spaced fluid inlet and outlet ports, said outlet port being connected to said housing bottom wall and said fluid inlet port being connected to the side wall,
   a transverse support within said housing and having therethrough a central opening connected to said outlet port,
   a pair of filter cartridges positioned on said support, each of which has therethrough a central bore, and each of which comprises a filter element and two end caps disposed, respectively, at the upper and lower ends of the filter element,
   one of said cartridges being disposed in spaced relation coaxially within the bore of the other cartridge on said support, and the outer cartridge of the pair being of a greater length than the inner cartridge to have its upper end positioned above the upper end of the inner cartridge,
   a first cover disposed in said housing and closing the bore of the inner cartridge and seating on top of the upper end cap of said inner cartridge,
   a second cover disposed in said housing above said first cover and closing the bore of said outer cartridge and seating on top of the upper end cap of said outer cartridge, and
   means within said housing for removably securing said two covers in place on their respective cartridges and for pressing said cartridges and their lower end caps sealingly onto said support around said opening, whereby fluid flowing through said housing between said ports must pass successively through the filter element walls of said cartridges,
   said means comprising a stationary bracket fastened in said outlet port,
   a bolt secured at its lower end to said bracket and extending through the bore of said inner cartridge and through both said covers, said bolt being threaded at its upper end, and
   two nuts, one of which threads onto said bolt below said second cover to engage the upper surface of said first cover to hold said first cover in place, and the other of which threads onto said bolt above said second cover to engage the upper surface of said second cover to hold said second cover in place, whereby upon removal of said other nut, said second cover may be removed without disturbing said first cover.

2. A filter as defined in claim 1, wherein a conduit is secured at one end in said outlet port and projects at its opposite end out of said housing for connection to a system for creating a pressure differential in said housing, a first tube projects from said conduit and extends to and communicates therethrough with said bore in said one cartridge, a second tube projects from said housing and communicates with the annular space between said cartridges, and both of said tubes are connected externally of said housing to first pressure responsive means to indicate the pressure differential between said space and said bore in said one cartridge.

3. A filter as claimed in claim 2, wherein said conduit is connected to a source of suction, a second conduit is provided for supplying fluid to said housing externally of said other cartridge, and means is provided connecting said second conduit and said second tube to second pressure differential indicating means.

References Cited

UNITED STATES PATENTS

| | | | |
|---|---|---|---|
| 2,082,871 | 6/1937 | Callery et al. | 210—90 |
| 2,919,765 | 1/1960 | Kasten | 55—497 |
| 2,962,121 | 11/1960 | Wilber | 55—497 |
| 2,979,159 | 4/1961 | Pritchard et al. | 55—510 |
| 3,012,631 | 12/1961 | Kaser | 55—504 |
| 3,186,391 | 6/1965 | Kennedy | 55—482 |
| 3,266,226 | 8/1966 | Muller et al. | 55—274 |
| 3,339,347 | 9/1967 | Otto | 55—500 |
| 3,347,026 | 10/1967 | Zankey | 55—505 |
| 1,328,044 | 1/1920 | Hills | 55—521 |
| 1,635,007 | 7/1927 | Orem | 55—504 |

FOREIGN PATENTS

| | | |
|---|---|---|
| 251,179 | 4/1964 | Australia. |
| 1,121,854 | 5/1956 | France. |
| 1,237,198 | 6/1960 | France. |
| 882,647 | 11/1961 | Great Britain. |
| 1,000,575 | 8/1965 | Great Britain. |

HARRY B. THORNTON, Primary Examiner

BERNARD NOZICK, Assistant Examiner

U.S. Cl. X.R.

55—481, 482, 498, 505, 510